United States Patent Office 2,897,202
Patented July 28, 1959

2,897,202

3-KETO-4-AZA-$\Delta^5$-STEROIDS AND METHOD OF PREPARING SAME

Bernard S. Wildi, Dayton, Ohio, assignor to Monsanto Chemical Company, St. Louis, Mo., a corporation of Delaware No Drawing. Application March 19, 1956
Serial No. 572,235

6 Claims. (Cl. 260—287)

This invention is directed to a novel method of preparing nitrogen containing derivatives of steroid compounds by a procedure which substitutes a nitrogen atom for an oxygen atom in one of the rings of a steroid derivative. The invention is also directed to novel $\alpha$-keto-$\beta$-azo-$\gamma$-unsaturated steroid compounds. The novel method is particularly directed to the preparation of these novel enol lactams, although other useful steroid derivatives can be prepared from the enol lactams. The invention is also directed to the enol lactone of progesterone as a novel compound.

The new method of my invention involves heating in the presence of a source of ammonia or a primary amine a compound having a cyclopentano-10,13-dimethylpolyhydrophenanthrene structure except that one of the nuclear rings contains an oxygen atom, and containing a keto group adjacent to the oxygen atom on one side, and a carbon-to-carbon double bond adjacent to the oxygen atom on the other side. The source of ammonia is preferably ammonia water, i.e., an aqueous solution of ammonia which is ammonium hydroxide.

My invention provides a simple, convenient method for replacing the hetero-oxygen atom of an $\alpha$-keto-$\beta$-oxa-$\gamma$-unsaturated steroid with a nitrogen atom. This procedure is very useful when it is desired to prepare a therapeutic aza steroid from an available oxa steroid. Even if the lactone of a given steroid is not available, many such lactones can be readily prepared by known methods, and the present invention provides a method of inserting the nitrogen atom into the steroid ring, without the use of any reducing agents so that the unsaturated bond adjacent to the oxygen atom does not become saturated. Although the conversion of steroids to $\alpha$-keto-$\beta$-oxa-$\gamma$-unsaturated steroids is old, it was not known until the present invention that $\alpha$-keto-$\beta$-aza-$\gamma$-unsaturated steroids could be prepared from steroids by an efficient procedure involving conversion of the steroid to the keto acid, thence to the $\alpha$-keto-$\beta$-oxa-$\gamma$-unsaturated steroid, and finally to the $\alpha$-keto-$\beta$-aza-$\gamma$-unsaturated steroid.

My steroids, particularly $\Delta^5$-3-keto steroid derivatives in which a nitrogen atom replaces the carbon atom in the position numbered $C_4$ in the steroid nucleus, are novel compounds of valuable therapeutic activity.

The $\alpha$-keto-$\beta$-oxa-$\gamma$-unsaturated steroids which I employ are ordinarily prepared from the keto acids of the steroids by heating in the presence of acetic anhydride and acetyl chloride (R. B. Turner, J.A.C.S. 72, 579 (1950)) or by heating the keto acids in the presence of acetic anhydride and sodium acetate. The keto acids are prepared by ozonolysis of a steroid containing a conjugated carbonyl group, i.e.,

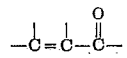

in the steroid nucleus. Some steroids containing conjugated carbonyl groups can also be oxidized to keto acids by hypohalite solutions, e.g., $\Delta^4$-cholesten-3-one is oxidized to the keto acid by sodium hypobromite.

The series of reactions to prepare the $\alpha$-keto-$\beta$-aza-$\gamma$-unsaturated polyhydro-10,13-dimethylcyclopentanophenanthrenes can be represented by the following reactions with progesterone:

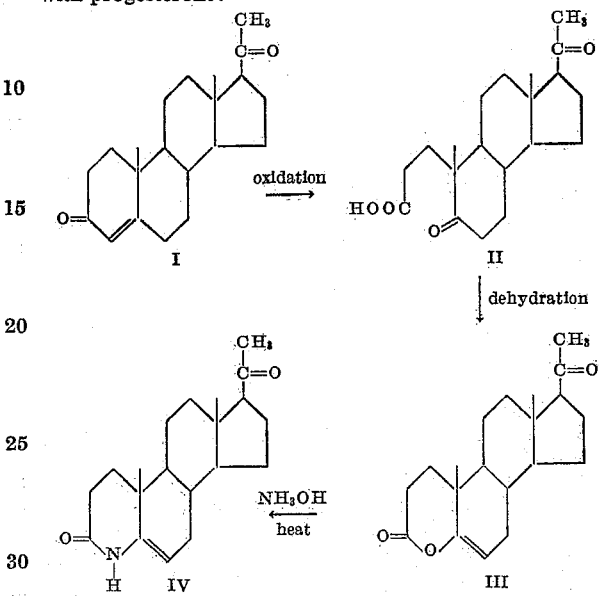

The steroid (I) containing conjugated carbonyl unsaturation is oxidized to cause ring cleavage and formation of the keto acid (II), which is heated under dehydrating conditions to cause ring closure and formation of (III), wherein the lactone oxygen is in the position originally occupied by an unsaturated carbon atom in the steroid, and adjacent to the carbonyl carbon atom. The compound (III) is then heated in the presence of ammonia to produce (IV), the nitrogen atom being in the position originally occupied by the unsaturated carbon atom adjacent to the carbonyl group.

The procedure of the present invention is generally applicable to $\alpha$-keto-$\beta$-oxa-$\gamma$-unsaturated steroids. It will be understood of course, that the nor- and homo-steroids are included in the group of steroids; e.g., the 18-nor, 19-nor, A-nor, D-nor, D-homo and D-bis-homo steroids can be used. The process is also applicable to the cyclopentano-10,13-dimethylpolyhydrophenanthrenes regardless of the type of side chain on the 17-carbon atom; for example, the procedure can be applied to the $\alpha$-keto-$\beta$-oxa-$\gamma$-unsaturated derivatives of the sapogenins, the sitosterols, the stigmasterols, the ergosterols, the sexual hormones, etc. In some cases, it will be necessary to protect reactive groups in the side chain by known methods during the ozonization step, but once the oxa compound is prepared, the amination step can ordinarily be conducted without protecting such groups. The steroids can also contain other substituents, such as keto groups, hydroxyl groups, acyloxy groups, unsaturated groups, halo groups, etc. The step of heating with ammonium hydroxide will not ordinarily affect such groups, except in a few cases; e.g., acid groups will react to give the amide or ammonium salt derivatives; however, even in these cases an $\alpha$-keto-$\beta$-aza-$\gamma$-unsaturated steroid is still produced.

The procedure of the present invention can be applied to steroids containing the following groups: $\Delta^3$-1-keto-2-oxa-, $\Delta^4$-2-keto-3-oxa, $\Delta^1$-4-keto-3-oxa-, $\Delta^4$-7-keto-6-oxa, $\Delta^{8(9)}$-6-keto-7-oxa, $\Delta^{8(9)}$-12-keto-11-oxa-, and $\Delta^{14}$-17-keto-16-oxa. Other compounds which can be used in the reaction can be obtained if the rings are expanded;

for example, a D-homo steroid has a D-ring which is similar to the A-ring so far as obtaining the α-keto-β-oxa-γ-unsaturated structure is concerned.

EXAMPLE 1

$\Delta^5$-4-oxacholesten-3-one, 0.500 gram, and 75 ml. of concentrated ammonium hydroxide (58.6%) was heated at 200° C. for 48 hours. The mixture was cooled and filtered to give 0.406 gram of solid of M.P. 247–253° C. The 4-aza-$\Delta^5$-cholesten-3-one was recrystallized from acetone to give 0.316 gram of the compound of M.P. 249–253° C. Ultraviolet analysis showed λ max 233 mμ and infrared analysis showed a carbonyl group at 6.03 mμ and an —NH group at 3.23 mμ.

$\Delta^5$-4-oxacholesten-3-one above was prepared by dissolving 8.4 grams of $\Delta^4$-cholesten-3-one in a solution of 120 ml. of freshly distilled ethyl acetate and 120 ml. of acetic acid. The solution was cooled to −10° C. and ozone was passed in at a setting of 100 volts, at a rate of 0.04 cu.ft./min. and under 8 lbs. pressure, for 50 minutes, white crystalline precipitate being formed after 30 minutes. Water, 40 ml., and 4 ml. of 30% hydrogen peroxide were added, and the mixture was allowed to stand overnight. The keto acid product was worked up by alkaline extraction, acidification of the extracts, extraction with ether, evaporation of the ether, and recrystallization of the residue from ether-petroleum ether to give 5.79 grams of the keto acid of cholestenone of M.P. 144–147° C. The keto acid, 2 grams, was refluxed in 25 ml. of acetic anhydride and 10 ml. of acetyl chloride for 64 hours. The solvent was evaporated under water pump vacuum at 100° C. The residue was taken up in ether, washed with water and bicarbonate, dried over $Na_2SO_4$ and the ether solution was evaporated to dryness. The residue was recrystallized from acetone-water to yield 0.246 gram of the $\Delta^5$-4-oxacholesten-3-one of M.P. 83–86° C. Another recrystallization from acetone-water solution raised the melting point to 86–88° C.

EXAMPLE 2

Progesterone, 10 grams, was dissolved in a solution of 100 ml. of ethyl acetate and 100 ml. of acetic acid and ozonized at 100 volts, 0.4 cu.ft./min., and 8 lbs. pressure at −10° C. for 45 minutes. The reaction mixture was evaporated to dryness, and the procedure was repeated using a 30-minute ozonization period. Then 5 ml. of 30% $H_2O_2$ in 50 ml. of water was added and the mixture was allowed to stand for 18 hours at room temperature after which a large quantity of ether was added. The ether solution was washed with water and then extracted with three 100 ml. portions of dilute potassium hydroxide. The potassium hydroxide extracts were combined and acidified with dilute hydrochloric acid. The precipitate was taken up in ether, washed with water, dried over $Na_2SO_4$ and evaporated to dryness. The solid residue was dissolved in 500 ml. of ether which was then concentrated to 75 ml. Precipitation was caused by adding 25 ml. of hexane to yield 1.6 grams of the keto acid of progesterone of M.P. 168–170° C.

The above procedure was repeated, starting with 12 grams of progesterone.

The keto acid of progesterone, 6 grams, was heated at 80° C. for 2 hours under nitrogen with 100 ml. of acetic anhydride and 40 ml. of acetyl chloride. The reaction mixture was cooled and distilled under vacuum. The residue was dissolved in acetone, treated with charcoal (Darco) filtered, and the filtrate was concentrated. Petroleum ether (Skelly B) was added to precipitate the product which was either 4-oxa-$\Delta^5$-pregnene-3,20-dione or a similar material with a partially dehydrated and acetylated side chain, i.e., having a

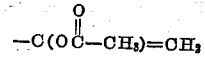

group on the 17-position.

The above product, 2 grams, was added to 90 ml. of concentrated $NH_4OH$ and the mixture was heated for 18 hours in a bomb at 200° C. The mixture was cooled, evaporated to dryness, and recrystallized from an ethanol-water solution to yield 0.1813 gram of M.P. 282–286° C. (with decomposition). The $\Delta^5$-4-azapregnen-3,20-dione was recrystallized to give a melting point of 293–300° C. (with decomposition).

EXAMPLE 3

$\Delta^5$-4-oxapregnen-3,20-dione; 6.0 grams, and 90 ml. of concentrated $NH_4OH$ were placed in a bomb and heated at 200° C. for 42 hours. The reaction mixture was cooled and filtered and the solid precipitate was recrystallized from ethyl alcohol. The first crop of crystals, M.P. 296–302° C. (dec.), amounted to 1.685 grams. The second crop, of M.P. 292–298° C. (dec.) and 0.788 gram in amount had the following analysis:

Calc'd. for $C_{20}H_{29}O_2N$: C, 76.15; H, 9.26; N, 4.44. Found: C, 76.00; H, 9.40; N, 4.78.

The $\Delta^5$-4-azapregnen-3,20-dione, exhibited marked anti-inflammatory activity in tests with rats with inflammed ankles.

The table below compares the anti-inflammatory activity of the compound in the Winters modification of the Selye inflammation test with rats with inflamed ankles, to the activity of cortisone in that test. The dosages were 50 mg./kg. subcutaneously.

*Table I*

| Compound | "t" | |
|---|---|---|
| | 24 hours | 48 hours |
| $\Delta^5$-4-azapregnen-3,20-dione | 7.45 | 6.65 |
| Cortisone acetate | 2.59 | 2.73 |

The values for "t" in Table I are statistical values showing differences between treated and non-treated animals. It can readily be seen that the $\Delta^5$-4-azapregnen-3,20-dione has a marked effect, the effect being much greater than that of cortisone.

The $\Delta^5$-4-azapregnen-3,20-dione above was prepared by dissolving 10 grams of the keto acid of progesterone in 100 ml. of acetic anhydride, adding 7 grams of anhydrous sodium acetate, and refluxing for 2 hours. This derivative has anti-inflammatory activity equal to that of cortisone in tests with rats.

EXAMPLE 4

Cortisone acetate, 5.0 grams, was dissolved in 700 ml. of dry ethyl acetate and cooled in a Dry Ice-methanol solution. Ozone was passed through the mixture for 45 minutes during which time the solution became light blue in color. The ozonolysis was stopped and 7.5 ml. of 30% $H_2O_2$ was added to the solution followed by 7.5 ml. of methanol. The solution was kept at room temperature for 72 hours. The material was worked up and crystallized to give 3,5-seco-17α-hydroxy-21-acetoxy-5,11, 20-triketo-pregnane-3-oic acid of M.P. 158–159° C.

Analysis for $C_{22}H_{30}O_3 \cdot 1.5H_2O$: Calc'd: C, 58.77; H, 7.39. Found: C, 58.88; H, 7.31.

The keto-acid product was suspended in 60 ml. of acetic anhydride and 200 grams of sodium acetate was added. The solution was refluxed for 1 hour, cooled, and evaporated to dryness. The residue was extracted successively with several portions of ethyl ether and several portions of ethyl acetate. The extracts were combined, washed, and dried. The material was filtered and the filtrate was evaporated to dryness. The residue was dissolved in phenol and chromatographed on a column of acidic $Al_2O_3$. Methanol, 150 ml., separated a cream colored solid, the 4-oxa-17α-hydroxy-21-acetoxy - $\Delta^5$ - pregnene-3,11,20-trione.

Upon heating one gram of the compound in a bomb for about 18 hours with 15 ml. of concentrated $NH_4OH$, 4-aza-17α-hydroxy-21-acetoxy-Δ⁵-pregnene-3,11,20-trione is produced.

EXAMPLE 5

The keto acid of cortisone acetate is converted to the 4-oxa-17α,21-diacetoxy-Δ⁵-pregnene-3,11,20-trione, or the 4-oxa-17α-hydroxy-21-acetoxy-Δ⁵-pregnene-3,11,20-trione, depending upon the reaction time, according to the procedure of Solaway et al., J.A.C.S. 75, 5442 (1953). Both the mono- and the diacetoxy compounds are converted to the 4-aza derivatives according to the procedure of Example 4 using reaction times of 20 to 30 hours.

The 4-aza derivatives of cortisone can also be prepared by heating the keto acid of cortisone with ammonium hydroxide in a bomb for six hours at 150° C. as described in my copending application, Serial No. 572,237, filed of even date herewith.

EXAMPLE 6

The procedure of Example 1 was carried out with 7-ketocholesterol which can be obtained by oxidation of cholesterolacetate with chromic acid (Windaus et al., Ann. 520, 98 (1935)). The ozonization procedure first converts the 7-ketocholesterol to 3-acetoxy-5,7-seco-5-keto-cholestane-7-oic acid, which is then converted by refluxing in acetic anhydride with sodium acetate to the 4-oxa derivative and then by heating with ammonium hydroxide to 3-acetoxy-6-aza-Δ⁴-cholesten-7-one. This compound can be readily saponified to the corresponding 3-hydroxy compound.

EXAMPLE 7

Testosterone acetate was ozonized to the corresponding keto acid by passing ozone into a solution of 7.29 grams of the acetate in 400 ml. of ethyl acetate and 100 ml. of acetic acid, at a rate of 0.4 cu. ft./min. under 8 lbs. pressure and at a setting of 100 volts, for 45 minutes at —60° C. The solution was warmed to —30° C. and 400 ml. of acetic acid and 5 ml. of hydrogen peroxide in 40 ml. of water was added, and the solution was allowed to stand for 18 hours. The reaction mixture was worked up as in the previous examples, and the product was recrystallized from ether-acetone to give the keto acid of testosterone acetate of melting point, 202–205° C. The keto acid is converted to the 3-keto-4-oxa-Δ⁵-derivative of testosterone acetate by refluxing with acetic anhydride and sodium acetate and this is converted to the 3-keto-4-aza-Δ⁵-derivative of testosterone acetate by heating for 18 hours at 200° C. in the presence of 20 parts of ammonium hydroxide. Upon recrystallization from ethyl alcohol, the compound has a melting point (with decomposition) of 306–308° C. By ordinary saponification procedures, the product is converted to the corresponding derivative of testosterone, i.e., 4-aza-17β-hydroxy-Δ⁵-androsten-3-one.

EXAMPLE 8

3,5-seco-5-keto-D-homo-Δ⁹⁽¹¹⁾,¹⁶-androstadien-3-oic acid is converted to the corresponding 3-keto-4-oxa-Δ⁵-compound by heating in the presence of acetyl chloride and acetic anhydride. Upon heating the 3-keto-4-oxa-Δ⁵ compound, 1.5 grams, with 90 ml. of concentrated ammonium hydroxide for 18 hours at 185° C., the corresponding 3-keto-4-aza-Δ⁵ compound is produced. The compound, after recrystallizing from alcohol has a melting point with decomposition of 242–245° C.

*Analysis.*—Calc'd. for $C_{19}H_{25}NO$: C, 80.52; H, 8.89; N, 4.95. Found: C, 80.32; H, 8.37; N, 5.19.

The compound has the formula:

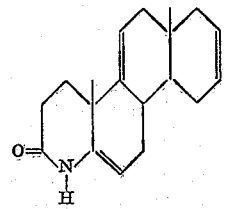

4-aza-Δ⁵,⁹⁽¹¹⁾,¹⁶-D-homo-androstatrien-3-one

The ozonator used in the present examples was calibrated by running for 2 hours at 0.04 cu. ft./min., 100 volts, and 8 lbs. pressure, and collecting the ozone in 400 ml. of 2% KI, acidifying and titrating with 0.1062 N $Na_2S_2O_3$, 154.8 ml. being required.

EXAMPLE 9

Upon heating 1 gram of the Δ⁵-4-oxacholesten-3-one and 70 ml. of N-butyl amine at 200° C. for 18 hours, the N-butyl Δ⁵-4-aza-cholesten-3-one is produced as a dark colored oil.

EXAMPLE 10

Δ⁵-4-oxacholesten-3-one, 1 gram, was acetylated by refluxing for 2½ hours in 30 ml. of pyridine and 15 ml. of acetic anhydride. The reaction mixture was evaporated to dryness and recrystallized from methanol after treatment with charcoal, and had a M.P. of 115–117° C. The compound was recrystallized from methanol, M.P. 116–118° C. The N-acetyl Δ⁵-4-azacholesten-3-one had the following analysis:

Calc'd. for $C_{28}H_{45}NO_2$: C, 78.63; H, 10.60; N, 3.27. Found: C, 78.62; H, 10.49; N, 3.45.

Ultraviolet analysis gave λ max of less than 220 mμ, and infrared gave no —NH absorption, acetate group absorption at 5.85 mμ and 7.97 mμ, and lactam carbonyl absorption at 5.95 mμ.

EXAMPLE 11

Δ⁵-4-azapregnen-3,20-dione was acetylated by heating 0.3 gram of the compound to reflux for two hours in a solution of 15 ml. pyridine and 5 ml. of acetic anhydride. The N-acetyl product was recrystallized from methyl alcohol.

The 3-keto-4-aza-Δ⁵ compounds of the present invention can be converted to 3-keto-4-aza-derivatives by reduction over palladium catalyst; or by Bouveault-Blanc reduction, the keto group can be reduced to a hydroxy group or a methylene group.

A few of the steroids, other than those set forth in the examples above, which can be used in the present invention are: 2-oxa-Δ³-cholesten-1-one, 2-oxa-Δ³,⁵-pregnadien-1,11,20-trione, 2-oxa-17β-hydroxy-Δ³-testen-1-one, 3-oxa-Δ¹-pregnen-4,20-dione, the methyl ester of 4-oxa-3-keto-Δ⁵-testene-17β-carboxylic acid, 6-oxa-Δ⁴-pregnen-7,20-dione, 6-oxa-Δ⁴-pregnen-7,11-dione, 11-oxa-4,5-dibromo-17α,21-diacetoxy-Δ⁸⁽⁹⁾-pregnen-3,12,20-trione, 16-oxa-Δ¹⁴-testen-17-one, 4-oxa-Δ⁵,⁹⁽¹¹⁾,²²-ergostadiene-3-one, 4-oxa-11-acetoxy-Δ⁵,⁷-pregnadien-3,20-dione, 19-nor-10ε-Δ⁵-4-oxapregnen-3,20-dione, etc.

The above 3-keto-4-aza-Δ⁵ compounds react respectively to give the desired, novel 3-keto-4-aza-Δ⁵ compounds, i.e., 2-aza-Δ³-chloesten-1-one, 2-aza-Δ³,⁵-pregnadien-1,11,20-trione, 2-aza-17β-hydroxy-Δ³-testen-3-one, 3-aza-Δ¹-pregnen-4,20-dione, the methyl ester of 4-aza-3-keto-Δ⁵-testen-17β-carboxylic acid, 6-aza-Δ⁴-pregnen-7,20-dione, 6-aza-Δ⁴-pregnen-7,11-dione, 11-aza-4,5-dibromo-17α,21-diacetoxy-Δ⁸⁽⁹⁾-pregnen-3,12,20-trione, 16-aza-Δ¹⁴-testen-17-one, 4-aza-Δ⁵,⁹⁽¹¹⁾,²²-ergostatrien-3-one, 4-aza-11 - acetoxy-Δ⁵,⁷-pregnadien-3,20-dione, 19-nor-10ε-Δ⁵-4-azapregnen 3,20-dione, etc. The N-alkyl, N-aryl, N-acyl, etc. derivatives of these compounds can be prepared by known methods. Preferred N-acyl derivatives are those resulting from reaction with formic, acetic, propionic, butyric, valeric, isovaleric, hexanoic, heptanoic, octanoic, cyclohexanoic, benzoic, toluic, salicylic and naphthoic acids, acid chlorides, and acid anhydrides, especially those acyl derivatives in which the acyl group has 1 to 8 carbon atoms.

Although the present process can be applied to substitute nitrogen atoms in any of the rings of the steroid, it is more readily applicable to substitution in the A-ring, because of the larger number of natural steroids which possess structures in the A-ring which can be cleaved to produce the keto-acids, and thereafter reacted to produce the 3-keto-4-oxa-$\Delta^5$ compounds. Some of the preferred 3-keto-4-oxa-$\Delta^5$ compounds for use in my process can be represented by the following structural formula:

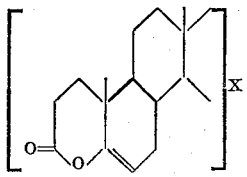

in which X is selected from

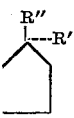

in which R' is —H, —OH,

and R" is —COOR,

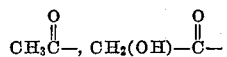

—H, —OH, CH$_3$CH$_2$—, —CH(CH$_3$)(CH$_2$)$_3$CH(CH$_3$)$_2$, RCOO—, or

—CH(CH$_3$)CH=CH—CH(CH$_3$)—CH—(CH$_3$)$_2$ and R is H, or an alkyl, aralkyl, or aryl group; and

It will be understood of course, that in the above structural formula there can be other non-interfering substituents or double bonds in the steroid nucleus.

The reaction of the foregoing compounds produce novel 3-keto-4-azo-$\Delta^5$ compounds; these novel compounds and their derivatives are represented by the following structural formula:

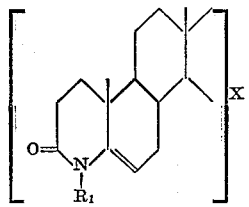

in which X has the same meaning as above and in which R$_1$ is hydrogen, and alkyl, aryl, aralkyl, or acyl group.

The novel compounds of my invention have valuable uses for therapeutic purposes. For example, some of my new compounds exhibit anti-inflammatory activity in tests which are related to activity against rheumatoid arthritis; for example $\Delta^5$-4-azapregnen-3,20-dione exhibits marked activity in these tests, and $\Delta^5$-17$\alpha$-acetoxy-4-aza-testen-3-one approaches the activity of cortisone. My new compounds have further uses in the preparation of other valuable organic compounds for therapeutic and other purposes.

My novel compounds can be prepared as disclosed and claimed in the present application. Or, the new compounds can also be prepared from keto acids or keto acid esters by the method disclosed and claimed in my co-pending application, Serial No. 572,237 filed of even date herewith. For example, the 3-keto-4-aza-$\Delta^5$ derivative of testosterone acetate can be prepared by heating the keto acid of testosterone acetate with 20 volumes of ammonium hydroxide at 200° C. for 18 hours. The N-butyl 3-keto-4-aza-$\Delta^5$ derivative of cholestenone can be prepared by heating 1 gram of the keto acid of cholestenone and 70 ml. of N-butylamine to 200° C. for 18 hours, and 4-aza-3-keto-D-homo-$\Delta^{5,9(11),16}$-androstatriene can be prepared by heating 1 gram of 3,5-seco-5-keto-D-homo-$\Delta^{9(11),16}$-androstadien-3-oic acid with 60 ml. of concentrated ammonium hydroxide for 18 hours.

Primary amines, such as lower alkyl or aralkyl amines can be used in place of ammonia to prepare N-alkyl or N-aralkyl lactams. For example, the following primary amines can be used; methyl amine, ethyl amine, n-propyl amine, n-butyl amine, isopropyl amine, 2-methyl-3-amino-propane, n-pentyl amine, n-hexyl amine, 2-methyl-4-amino-butane, n-octyl amine, cyclohexylamine, cyclohexylmethylamine, ethanol amine, 1-aminohexene-5, (2-phenylethyl) amine, (1-phenylethyl) amine, etc. The aromatic primary amines, e.g., aniline, p-ethylaniline, naphthylamines, etc., are less preferred because they are more difficult to react, but they can be used in the reaction.

While ammonium hydroxide is ordinarily the source of ammonia, it should be understood that ammonia gas can simply be passed over or through the steroid at the reaction temperature. While it is convenient to conduct the reaction under autogenous pressure in order to avoid the loss of volatile reactants, this is not considered essential to the process as the ammonia gas can be recycled and kept in contact with the steroid at lower pressures.

The reaction conditions for the formation of the 3-keto-4-aza-$\Delta^5$ compound can vary considerably; for example, temperatures of 100–250° C. can be used for 6 to 60 hours. Temperatures of 175 to 210° C. for 15 to 50 hours are ordinarily used. While a commercial concentrated ammonium hydroxide is ordinarily used for convenience, it is possible to use dilute ammonium hydroxide solutions, or more concentrated ammonium hydroxide, or ammonia itself. The primary amines can be used as such or dissolved in solvents. Some water should be present if it is desired to avoid the conversion of keto groups to imide groups; the water liberated in the reaction is usually sufficient for this purpose.

A method of preparing 3-keto-4-azo-$\Delta^5$ derivatives of steroids from steroids having conjugated carbonyl unsaturation, via the 3-keto-4-oxa-$\Delta^5$ derivatives of steroids has been described. A new class of valuable chemical compounds, the 3-keto-4-aza-$\Delta^5$ derivatives of steroids has been described.

I claim:
1. As a new compound, $\Delta^5$-4-azapregnen-3,20-dione.
2. As a new compound, $\Delta^5$-17$\alpha$-acetoxy-4-aza-testen-3-one.
3. A method of preparing 3-keto-4-aza-$\Delta^5$-steroids which comprises heating a compound of the structure:

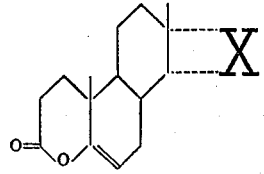

in which X is selected from the group consisting of

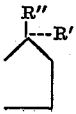

and

[cyclopentane ring structure]

and R' is selected from the group consisting of —H, —OH and $$-O\overset{O}{\underset{\|}{C}}R$$

and R" is selected from the group consisting of

—H, —OH, CH₃CH₂—, $CH_2(OH)-\overset{O}{\underset{\|}{C}}-$,

—CH(CH₃)(CH₂)₃CH(CH₃)₂, RCOO and —CH(CH₃)CH=CH—CH(CH₃)—CH—(CH₃)₂, and R is selected from the group consisting of —H and lower alkyl, to temperatures of 100 to 250° C. in the presence of a compound selected from the group consisting of ammonia, methyl amine, n-propyl amine, n-butyl amine, isopropyl amine, 2-methyl-3-amino-propane, n-pentyl amine, n-hexyl amine, 2-methyl-4-amino-butane, n-octyl amine, cyclohexyl amine, cyclohexylmethyl amine, (2-phenylethyl)amine and (1-phenylethyl)amine to produce a compound of the structure:

[steroid structure with X substituent and N-R₁]

in which X has the meaning set forth above, and R₁ is selected from the group consisting of hydrogen and the monovalent hydrocarbon radicals of the amine reactants set forth above.

4. The method of claim 3 in which the reaction is conducted for 6 to 60 hours in a closed system in the presence of ammonium hydroxide.

5. The method of claim 3 in which $\Delta^5$-4-oxapregnen-3,20-dione is converted to $\Delta^5$-4-azapregnen-3,20-dione.

6. The method of heating $\Delta^5$-4-oxapregnen-3,20-dione at 100–250° C. for 6 to 60 hours in a closed system with ammonium hydroxide to obtain $\Delta^5$-4-azapregnen-3,20-dione.

References Cited in the file of this patent

UNITED STATES PATENTS

| 2,227,876 | Bolt | Jan. 7, 1941 |
| 2,738,350 | Mazur | Mar. 13, 1956 |
| 2,760,975 | Knowles | Aug. 28, 1956 |

OTHER REFERENCES

Kaufmann: J. Am. Chem. Soc., vol. 73, April 1951, pp. 1779–1780.

Turner: J.A.C.S., vol. 72, 1950, pp. 579–585.

Wagner et al.: Synthetic Org. Chem. (N.Y.), John Wiley, 1953, page 576.

UNITED STATES PATENT OFFICE
CERTIFICATE OF CORRECTION

Patent No. 2,897,202                                July 28, 1959

Bernard S. Wildi

It is hereby certified that error appears in the above numbered patent requiring correction and that the said Letters Patent should read as corrected below.

Column 2, lines 27 to 29, between formulas IV and III, for $$\underset{\text{heat}}{\overset{NH_3OH}{\longleftarrow}} \quad \text{read} \quad \underset{\text{heat}}{\overset{NH_4OH}{\longleftarrow}}$$

Signed and sealed this 9th day of April 1963.

(SEAL)
Attest:

ESTON G. JOHNSON
Attesting Officer

DAVID L. LADD
Commissioner of Patents